Feb. 13, 1962 W. E. LA VOIE 3,021,250
DOUBLE-FACED ADHESIVE MATERIAL AND METHOD OF MAKING SAME
Filed Sept. 27, 1957
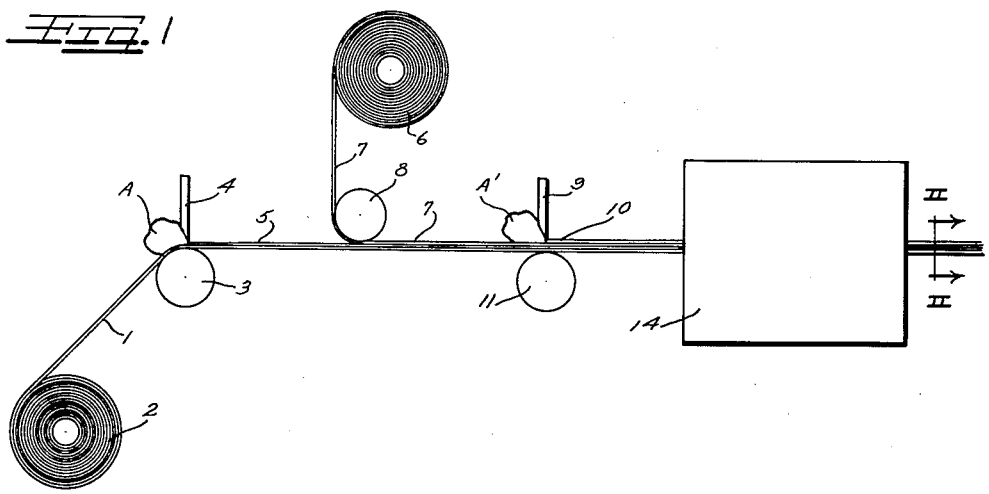
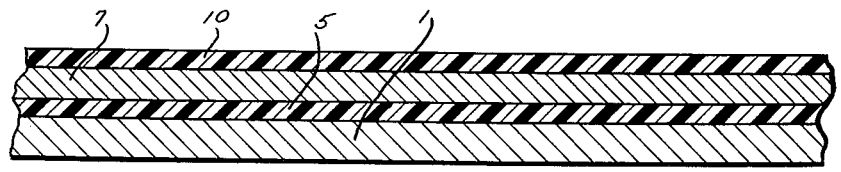
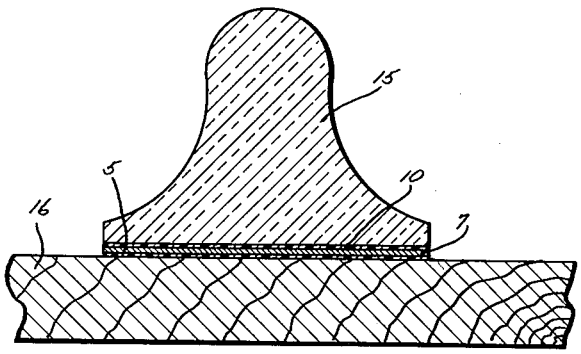
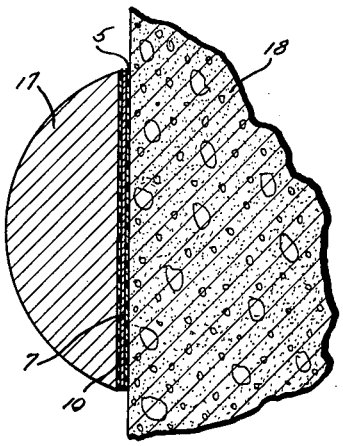
Inventor
WILLIAM E. LA VOIE

United States Patent Office 3,021,250
Patented Feb. 13, 1962

3,021,250
DOUBLE-FACED ADHESIVE MATERIAL AND
METHOD OF MAKING SAME
William E. La Voie, Chicago, Ill., assignor to Chicago
Backing Co., Chicago, Ill., a corporation of Illinois
Filed Sept. 27, 1957, Ser. No. 686,620
4 Claims. (Cl. 156—324)

This invention relates to improvements in a double-faced adhesive material and to a method of making the same, and more particularly to an adhesive material highly desirable for joining one object to another, the material being disposed between the objects and in most cases being entirely invisible, and yet firmly holding the objects together for an indefinite period of time, although the invention will have other uses and purposes as will be apparent to one skilled in the art.

In the past, double-faced adhesive tapes have been made, and have been used for many purposes including the attachment of various decorative items or articles of apparel to the human body. However, in each instance of which I am aware, this formerly known double-faced adhesive tape was generally of the character of the commonly known surgical adhesive tape with an extra adhesive spread on the outer face thereof, or if made to attach certain objects together, the supporting material was even thicker than that of the surgical adhesive tape. As a result of the thickness of the material and the adhesive spreads thereon, the duration of use was materially shortened because air could enter between the objects by virtue of the spacing caused by the tape, and thus the objects would begin to separate at least at the edges and there was always danger of their being knocked apart. Further, double-faced adhesive material heretofore produced was objectionably costly both to manufacture and use, and was made by a method embodying an objectionable amount of time and labor.

With the foregoing in mind, it is an important object of the instant invention to provide a double-faced adhesive material which is extremely thin whereby two parts may be joined together by the material and the material itself will be substantially invisible at all times so that it may well be used to join together a pair of thin fabrics as well as objects of substantial density and weight.

Another object of the instant invention is the provision of double-faced adhesive material which is less than .02 inch in thickness including not only a base sheet, but both adhesive spreads as well.

Still another object of the instant invention is the provision of a double-faced adhesive bonding material of such thinness that there are merely means for supporting two adhesive surfaces, whereby objects may be joined together so tightly that it is substantially impossible for air to enter the crack between the objects to an extent that would injure the holding power of the adhesive, whereby the objects may remain united as long as desired, but can ultimately be separated if deemed necessary.

A further feature of the instant invention resides in the provision of a double-faced adhesive material highly desirable for uniting objects together, and which objects may be of substantially any substance or material and need not necessarily be of the same substance or material.

Also an object of the instant invention is the provision of a double-faced adhesive material comprising a thin film-like base sheet having a pressure sensitive adhesive spread on both faces thereof.

Still another feature of the instant invention is the provision of a double-faced adhesive material comprising a thin sheet of tissue paper such as rice tissue having a thin pressure sensitive adhesive spread on each side thereof.

It is also an object of this invention to provide a new and novel method of making a double-faced adhesive material.

While some of the more salient features, characteristics and advantages of the instant invention have been above pointed out, others will become apparent from the following disclosures, taken in conjunction with the accompanying drawing, in which FIG. 1 is a diagrammatic view illustrating steps in the process of making a double-faced adhesive material under the teachings of the instant invention;

FIG. 2 is a fragmentary vertical sectional view, greatly magnified, of the resultant material and taken substantially as indicated by the line II—II of FIG. 1;

FIG. 3 is a fragmentary vertical sectional view illustrating a use of the resultant material, but illustrating the material itself enlarged out of proportion to the other parts, for purpose of clarity; and FIG. 4 is a fragmentary vertical sectional view illustrating another use of the material and also showing the material itself enlarged out of proportion to the other parts of the drawing, for purposes of clarity.

As shown on the drawings:

For purposes of clarity, the product embodied in the instant invention will be described by way of the method of making the product. During the practice of that method, a sheet of protective or facing material 1 may be fed along a predetermined path from a stock roll 2. This facing sheet 1 may be of any suitable material that will cover a pressure sensitive adhesive surface tightly, and yet be readily removable from that adhesive surface when it is desired to put the resultant material to use. The facing sheet 1 may satisfactorily be a silicone surfaced paper, a thermoplastic film such as a cellulose acetate film, or any other substance suitable for the purpose. During the course of its travel the facing sheet 1 may be turned over a guide roll 3 and passed beneath a doctor blade 4 preferably disposed over the guide roll 3 so this roll may act as suitable backing for the knife edge at the bottom of the doctor blade. On the sheet 1 and in front of the doctor blade, an adhesive mass A is placed by hand or by any suitable means. This adhesive mass is of such consistency that it will immediately spread the full length of the doctor blade or full width of the sheet 1, if the sheet is not wider than the blade. As the sheet 1 travels along, the elongated adhesive mass A will remain against the doctor blade, and the distance between the blade and the roll 3 determines the thickness of the adhesive spread 5 which is formed over all or a part of the facing sheet 1.

Next, from a suitable supply roll 6, a film-like base sheet 7 is fed around a guide and pressure roll 8 and positioned firmly over the adhesive spread 5 so that this base sheet is positively united with the adhesive spread and uniformly so.

This base sheet 7 is preferably a very thin material and in the preferred form of the invention it is approximately .005 inch or less in thickness. Among the satisfactory substances for the base sheet may be mentioned tissue paper, thin rice tissue paper, a non-woven cotton sheet, a thermoplastic film such as an acetate film, as well as other substances capable of positively carrying an adhesive spread without losing its bond therewith.

At this point, the method may divide itself into two variations. The first and most desirable of these would be to pass the assembly thus far produced, including the facing sheet 1, the adhesive spread 5, and the base sheet 7, beneath another doctor blade 9 in front of which a second adhesive mass A' is disposed. Traveling beneath the doctor blade, the upper face of the base sheet 7 acquires a uniform adhesive spread 10 substantially of the same thickness and character as the aforesaid spread 5. Directly beneath the knife edge of the doctor blade is a backing roll 11, or the equivalent, to insure an even spread of adhesive. Next, the assembly is passed through a drying or curing oven or the equivalent 14 and the product may then be rolled with the topmost adhesive spread 10 coming in contact with the exposed surface of the facing sheet 1.

The second variation of the method is one desirable for use where floor space and manpower are at a minimum, and in that instance, the oven or equivalent 14 may be disposed nearer the pressure roll 8 which applies the base sheet 7 to the adhesive spread 5. In this variation, the assembly is than passed through the oven or equivalent 14, and since at that time the assembly has a dry untacky surface on both sides, it may be rolled in any direction and unrolled at will. After being passed through the oven 14, the rolled assembly is substituted for the stock roll 2, and then unwound with the base film or sheet 7 uppermost and again passed through the same set of apparatus wherein it would acquire an upper spread 10 of adhesive by virtue of the doctor blade 4 and the adhesive mass A. It is again passed through the oven and merely repeats the first process, and then may be rolled in such direction that the adhesive surface 10 contacts the exposed surface of the facing sheet 1.

In each variation of the method, the same product is ultimately produced.

The finished product, therefore, comprises only an extremely thin base sheet 7 with the adhesive spreads 5 and 10 on opposite faces thereof. Consequently, the entire product may be only .008 inch in thickness, and preferably does not exceed .025 inch in thickness, depending upon the thickness of the base sheet. Usually the ultimate thickness will be close to .008 inch with a base sheet of tissue or a light gauge of film such as acetate film. The adhesive spreads 5 and 10 may be rubber base pressure sensitive adhesives of a known character.

Consequently, the finished double-faced adhesive film will be substantially invisible when placed between two objects. However, it is not to be understood that the instant material is usuable only for thin and lightweight substances, but it may be used to hold heavy and solid objects together equally as well. If the object to be held has a flat surface, and the object to which it is to be attached has a flat surface, pressing the material between those flat surfaces results in rendering the material substantially invisible, leaving a substantially invisible crack between the two objects, and effectively excludes all ambient air, whereby the objects will remain tightly adhered to each other through an indefinite period of time and substantially for as long as desired. This is true because the pressure sensitive adhesive is of a non-drying character, and if air is excluded will retain its adhesive characteristics indefinitely. The resultant material will adhere to substantially any other substance, including cloth, wood, metal, foil, glass, thermoplastics or thermosetting plastics, enameled surfaces, etc.

In FIGS. 3 and 4 I have illustrated, by way of example and not by way of limitation, two uses of the instant material. As stated above, it should be especially noted that in the showings of these figures, the material itself is greatly exaggerated and totally out of proportion to the objects which it unites, so that it may be clearly shown in the drawings. It will be understood that in actual practice the thin sheet of double-faced adhesive film would be practically invisible.

Looking at FIG. 3, it will be seen that a knob, hook, bracket, or the like 15 of a thermosetting plastic or porcelain or similar material may be effectively joined to a wooden object 16 by disposing the double-faced adhesive film therebetween and pressing the objects firmly into engagement with each other. It makes no difference whether the adhesive film is applied first to the object 15 or the object 16, since it is equally as effective either way. In using the invention, however, it is simply necessary to apply the exposed adhesive surface to one of the objects; and thereafter remove the facing sheet and apply the other adhesive surface to the other object. Thus it will be seen that the instant invention is extremely easy to utilize.

In FIG. 4, I have illustrated the attachment of an object 17 to a vertical plaster or concrete wall 18, which wall may have a painted or enameled surface or a naked smooth surface. The double-faced adhesive film is disposed between the wall and the object 17 in the manner above described, and in this instance the object may be a molding or similar decoration, a picture frame, a hook-supporting rail for the hanging of light objects, or in fact many other devices. Assuming the object 17 to be a picture frame, it is simply necessary to apply the double-faced adhesive film between the frame and the wall, and no supporting wire or cord is necessary, but the picture may appear glued flatly to the wall, thereby eliminating unsightly angularity and different angularities between or among the various pictures in a room. Likewise, there is no possibility of a picture so mounted becoming askew.

The foregoing illustrations will indicate the practicality of the instant invention, and it will be noted that it is extremely economical to manufacture and use and highly effective in its operation. Further, the material is longer enduring than a thicker material would be, and is stronger in gripping power by virtue of the fact that one of the adhesive layers will partially penetrate the base film-like sheet 7 if that is of tissue, rice tissue, non-woven cotton, or some similar substance, and the other adhesive spread will partially penetrate the base sheet from the opposite direction so that, in effect, the two objects may be joined by what may be termed an integral or unitary adhesive bond.

It will be understood that modifications and variations may be effected without departing from the scope of the novel concepts of the present invention.

I claim as my invention:

1. The method of making a double-faced adhesive material, including the steps of feeding a facing sheet having a release surface along a predetermined path, applying a thin spread of non-drying and tacky pressure sensitive adhesive to the release surface of said sheet, laying a thin film-like sheet firmly over said adhesive spread, and applying another similar adhesive spread over the exposed face of said film-like sheet.

2. The method of making a double-faced adhesive material, including the steps of feeding a facing sheet having a release surface along a predetermined path, applying a thin spread of non-drying and tacky pressure sensitive adhesive to the release surface of said sheet, laying a thin sheet of tissue paper firmly over said adhesive spread for positive union therewith, and applying a similar adhesive spread to the exposed face of said tissue paper sheet.

3. The method of making a double-faced adhesive material, including the steps of feeding a facing sheet having a release surface along a predetermined path, applying a thin spread of non-drying and tacky pressure sensitive adhesive to the release surface of said sheet, laying a thin film-like sheet firmly over said adhesive spread to establish positive union therebetween, heat treating the adhesive spread, applying another similar adhesive spread to the exposed face of said film-like sheet, and heat treating the last applied spread.

4. The method of making a double-faced adhesive material, including the steps of applying a thin spread of non-drying and tacky pressure sensitive adhesive over one side of a facing sheet having a release surface on each side thereof, laying a thin film-like sheet firmly on said adhesive spread to establish a positive union therewith, applying a similar adhesive spread over the exposed face of said film-like sheet, and rolling the material while utilizing the free release surface of the facing sheet as a temporary protector between adjacent turns of the roll.

References Cited in the file of this patent

UNITED STATES PATENTS

| | | |
|---|---|---|
| 1,960,137 | Brown | May 22, 1934 |
| 1,979,691 | Jackson | Nov. 6, 1934 |
| 2,206,899 | Kellgren | July 9, 1940 |
| 2,323,342 | McManus | July 6, 1943 |
| 2,407,549 | Gurwick | Sept. 10, 1946 |
| 2,430,534 | Rodli | Nov. 11, 1947 |
| 2,463,244 | Carter | Mar. 1, 1949 |
| 2,556,078 | Francis | June 5, 1951 |
| 2,607,711 | Hendricks | Aug. 19, 1952 |
| 2,633,440 | Scholl | Mar. 31, 1953 |
| 2,652,351 | Gerhardt | Sept. 15, 1953 |
| 2,725,325 | Seymour | Nov. 29, 1955 |
| 2,784,131 | Fletcher | Mar. 5, 1957 |
| 2,822,290 | Webber | Feb. 4, 1958 |
| 2,829,073 | Williams | Apr. 1, 1958 |
| 2,838,421 | Sohl | June 10, 1958 |
| 2,862,613 | Klemka et al. | Dec. 2, 1958 |